US010574600B1

(12) United States Patent
Chiarella et al.

(10) Patent No.: US 10,574,600 B1
(45) Date of Patent: Feb. 25, 2020

(54) ELECTRONIC MAILBOX FOR ONLINE AND OFFLINE ACTIVITIES

(71) Applicant: Amazon Technologies, Inc., Seattle, WA (US)

(72) Inventors: Sharon Elizabeth Chiarella, Sammamish, WA (US); David W. Law, Seattle, WA (US); Balaji Nageswaran, Sammamish, WA (US); Nassir Samatar, Redmond, WA (US); Shreeraj Sutaria, Seattle, WA (US); Amber Autrey Taylor, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 280 days.

(21) Appl. No.: 15/081,660

(22) Filed: Mar. 25, 2016

(51) Int. Cl.
   *H04L 12/58* (2006.01)
(52) U.S. Cl.
   CPC .......... *H04L 51/043* (2013.01); *H04L 51/12* (2013.01); *H04L 51/28* (2013.01); *H04L 51/34* (2013.01)
(58) Field of Classification Search
   CPC ....... H04L 51/043; H04L 51/12; H04L 51/28; H04L 51/34; H04L 51/00–51/38; G06Q 30/0631; G06Q 30/0254; G06Q 30/0255; G06Q 30/0601
   See application file for complete search history.

(56) References Cited

U.S. PATENT DOCUMENTS

| 8,447,664 B1* | 5/2013 | Pape | G06Q 10/087 |
| | | | 705/28 |
| 2002/0019763 A1* | 2/2002 | Linden | G06Q 30/02 |
| | | | 705/14.53 |
| 2011/0113109 A1* | 5/2011 | LeVasseur | H04L 51/12 |
| | | | 709/206 |
| 2011/0191693 A1* | 8/2011 | Baggett | G06F 16/35 |
| | | | 715/752 |
| 2012/0143798 A1* | 6/2012 | Sundelin | G06Q 10/107 |
| | | | 706/12 |

(Continued)

OTHER PUBLICATIONS

"Slice: It's Shopping Smarter" (https://www.youtube.com/watch?v=2ksK-G-yk5k) Published on Jul. 18, 2014. Screenshot of video is provided.*

(Continued)

*Primary Examiner* — Hamza N Algibhah
*Assistant Examiner* — James Ross Hollister
(74) *Attorney, Agent, or Firm* — Kilpatrick Townsend & Stockton LLP

(57) ABSTRACT

Techniques providing an email service for particular activities may be described. For example, an email message sent by an entity to an email address of a user may be received. The email address may identify an email box accessible to the user via a user interface of the email box. The email message may describe a status of an item ordered by the user from the entity. The description may use a format specific to the entity. A summary may be generated based on the email message. The summary may describe the status of the item in a different format. This format may be common to generated summaries, such that the summary may include fields common to another summary generated for another email message of another entity. The summary may be provided for presentation in the user interface of the email box.

20 Claims, 8 Drawing Sheets

(56) References Cited

U.S. PATENT DOCUMENTS

| | | | | |
|---|---|---|---|---|
| 2013/0021346 A1* | 1/2013 | Terman | ............... | G09B 5/08 |
| | | | | 345/467 |
| 2013/0024525 A1* | 1/2013 | Brady | ............... | G06Q 10/08 |
| | | | | 709/206 |
| 2014/0280614 A1* | 9/2014 | Alakuijala | ........... | H04L 51/32 |
| | | | | 709/206 |
| 2015/0234806 A1* | 8/2015 | Bhagwan | ........... | G06F 17/2765 |
| | | | | 705/7.18 |

OTHER PUBLICATIONS

"Package Tracker | Slice" (https://www.youtube.com/watch?v=qtXfaCoNMrk) Published on Nov. 7, 2015. Screenshot of video is provided.*

"Slice: Its Shopping Smarter". (https://www.youtube.com/watch?v=2ksK-G-yk5k) Published on Jul. 18, 2014. Screenshot of video is provided (Year: 2014).*

"Package Tracker | Slice" (https://www.youtube.com/watch?v=qtXfaCoNMrk) Published on Nov. 7, 2015. Screenshot of video is provided (Year: 2015).*

TripIt®. [online]. Concur Technologies, Inc., Mar. 2016 [retrieved on Mar. 23, 2016]. Retrieved from the Internet: <URL: https://www.tripit.com/>, 6 pages.

\* cited by examiner

ELECTRONIC MAILBOX FOR ONLINE AND OFFLINE ACTIVITIES

BACKGROUND

Many users are turning to online services to manage online and offline activities. Similarly, many entities that facilitate the online and offline activities also rely on the online services. An electronic mail ("email") service is an example of such online services. The email service generally allows the users and the service providers to exchange email messages that relate to the online and offline activities. A user may obtain a personal (or other type of) email address from a service provider that provides email hosting. Such service provider is commonly known as a mail service provider. The mail service provider may manage an email server to send, receive, process, and store email messages for the user. The user may access such functionalities based on the user's personal email address. Such functionalities may be accomplished by implementing Simple Mail Transfer Protocol (SMTP) and possibly providing access to messages through Internet Message Access Protocol (IMAP), the Post Office Protocol, Webmail, or other email-related protocols.

Often, the user may use the same personal email address for different types of online and offline activities facilitated by different entities. Hence, different types of email messages may be sent by the entities to the personal email address of the user. Because of the different types and, possibly, the large number of email messages that the user may receive on a periodic basis, using the email service to manage the different online and offline activities may become cumbersome. In addition, although the mail service provider may provide email filtering and sorting, such functionalities may not properly or efficiently manage particular types of online and offline activities. For example, such functionalities may filter out certain types of activities or may not even distinguish between other types of activities. Further, the email server may be computationally burdened with processing and storing email messages that are irrelevant to particular activities.

BRIEF DESCRIPTION OF THE DRAWINGS

Various embodiments in accordance with the present disclosure will be described with reference to the drawings, in which.

DETAILED DESCRIPTION

Figure 1:
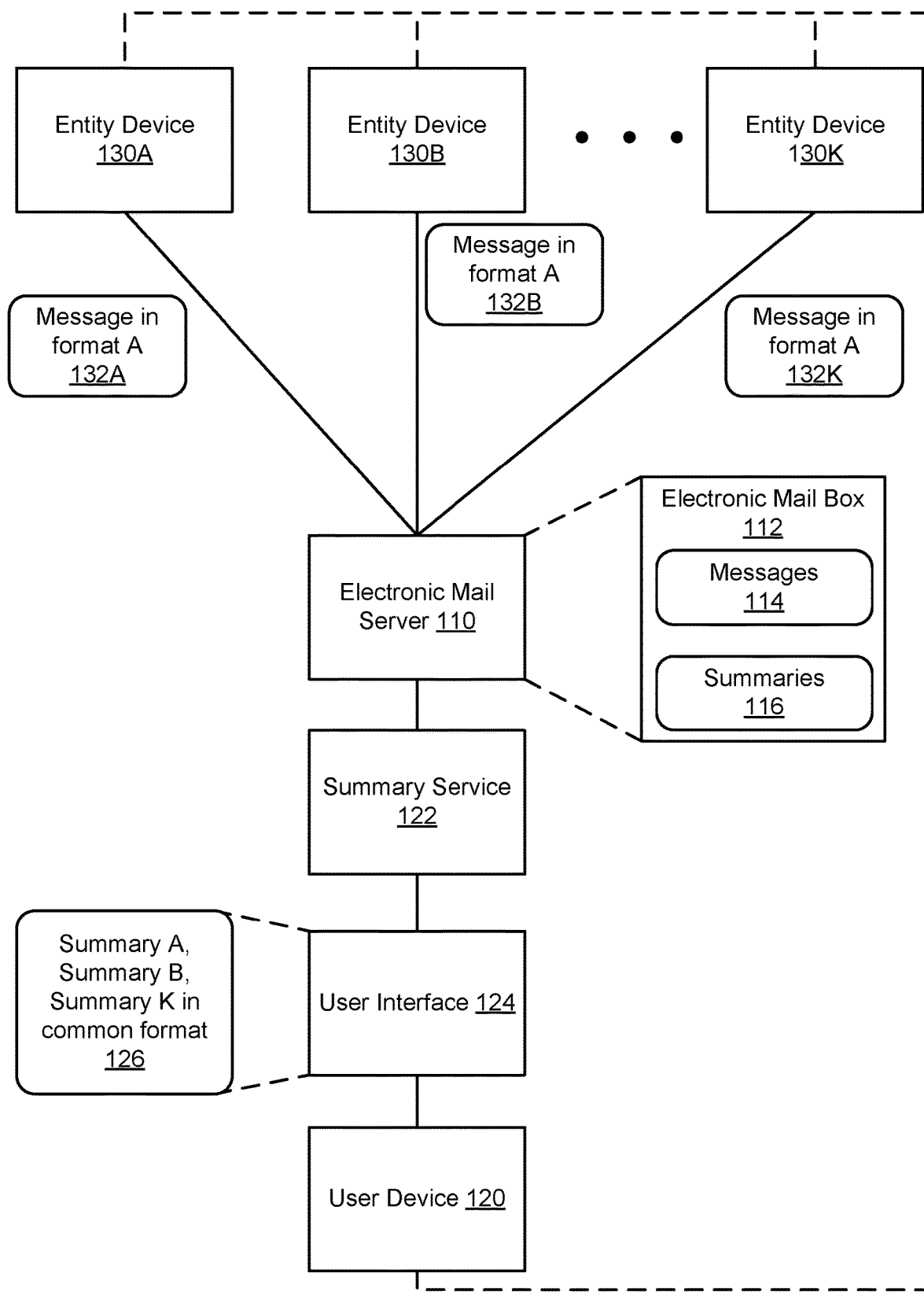
FIG. 1 is a block diagram illustrating an example computing environment for providing an email service, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, providing an email service for particular activities. The activities may be online, offline, or a combination of online and offline activities. Online activities may represent actions, tasks, and/or processes that are performed over a network of computing systems. Offline activities may represent actions, tasks, and/or processes that are performed absent such a network. Typically, a user may access the email service via a computing device and may request an email address for a particular activity. The email service may generate the email address for the user. The email address may identify an email box that is hosted on an email server, or on any other computer or data storage device. Email messages sent by entities to the email address may be stored in the email box. The email service may analyze the email messages according to the particular activity. For example, the email service may remove (e.g., delete) or store in a folder a portion of the email messages, if these messages are unrelated to the particular activity. Remaining email messages may be related and be relevant to the particular activity. For a related email message, the email service may generate a summary from such a message (e.g., from the title, subject, content, identifier of the sender, and/or identifier of the recipient). The summary may be stored in the email box in lieu of or in addition to the related email message. The user may access the email box via a user interface. Rather than presenting the related email message, the email service may present the summary in the user interface. The user interface may provide a read only access to the summaries and may not present the email messages. In other words, the email service may substitute user access to the email messages with user access to the summaries via the user interface. If the user desires to access an email message, the email service may provide an option, via the user interface for example, to forward the email message to another (i.e., an alternate) email address of the user. In this way, users and entities may be incentivized to use the email service in connection with the particular activity rather than as a general email service for all kind of activities (e.g., for general communications between any parties).

Such email services may provide various improvements over existing email services. For example, the user and entities may rely on the email service to communicate information about a particular activity. In this case, the user may need to only access and review summaries of email messages that relate to the particular activity. Such a functionality may reduce the amount of email messages that a user may need to filter through to identify the relevant email messages. In addition, the summaries may provide the relevant information to the user, thereby further improving the outcome of using the email service (e.g., the exchange of communication about the particular activity). In particular, the entities may use different formats for the email messages. Each of these formats may be specific to the respective entity. Hence, even if the user receives email messages that are only relevant to the particular activity, the format of these email messages may vary greatly. To reduce or eliminate such a variability, the email service may generate the summaries according to a common format. In other words, the summaries may have common fields regardless of sender or sender format difference. Of course, the email service may populate the fields for each summary from the respective email message. In this way, the user interface may present a summary view of email messages related to the particular activity. This view may concatenate all the information found in multiple email messages into a single, unified view. Thus, the user may manage aspects of the particular activity (e.g., understand status, initiate communication, and/or take appropriate actions) based on the summary view presented in the user interface rather than having to rely on the email messages of different formats. Additionally, by removing irrelevant email messages and/or replacing the relevant email messages with the summaries, the computational burden on the email server may be reduced, thereby improving memory and processor usages.

To illustrate, consider an example of an electronic platform configured to offer items to users over a network of computer systems. The electronic platform may have a domain name to facilitate the user access over the Web. For instance, the user may operate computing devices to access functionalities of the electronic platform at www.example-domain-name.com. The electronic platform may implement the above email service. In an example, the electronic platform may include an email server that provides an email box to the users. Domain parts of email addresses may relate to the domain name. For instance, an email address of a user may be example-user@shop-example-domain-name.com. The user may register with the email service to receive email messages about ordered items. The user's email box may be organized according to two folders: an order folder for order-related email messages and a non-order folder for other email messages. This may allow the user to use the email address to efficiently receive information about items ordered from the electronic platform and from other entities.

Hence, one entity may send an email message to that email address to inform a user that an item has shipped. Similarly, another entity may send another email message to that email address explaining that a payment for another item has been approved but that shipment has not commenced yet. These two email messages may have different formats, where each of the formats may be specific to the respective entity. For example, the subjects of the email messages may not follow a common nomenclature format. Similarly, information in the body of the email messages may be organized differently. In addition, a third entity may send an advertisement to the user's email address. In this example, the email service may parse the three emails and identify that only the first two relate to ordered items.

The email service may move the advertisement email message to the non-order folder of the user's email box. In comparison, the email service may generate a summary from each of the other two email messages and store the summaries in the order folder of the user's email box. Here, the use of an order-folder and a non-order folder is illustrative. Such folders may not be needed and, in some examples, may be merely for organizing the storage of the information included in the email messages. Instead, the email messages may be marked as relating to an order event absent the use of folders for storage. The summaries may use a common format. This common format may be the same format that the electronic platform uses to provide summaries about items ordered from the electronic format. For example, the common format may specify different fields such as an identifier of an entity providing an item, an identifier of the item, an order date, an order number, an order status, a payment confirmation, a delivery date estimate, and/or a return option. Accordingly, to generate a summary of an email message, the email service may populate the fields with information from the email message and/or, as needed, supplement the information from other sources.

The user may access the email box via a user interface. The user interface may present (e.g., display) a view of the email box. The view may include a summary view showing the summaries. Optionally, the view may also include a non-order view listing non-order related emails. Upon a selection of the order view, the summaries are listed. The summaries may be sorted, organized, or filtered based on any of the fields. Upon a selection of a summary, the respective populated fields are presented. In comparison, upon a selection of the non-order view, an identifier of the advertisement email message is presented. For instance, the third entity, the date, and the subject of that email message are presented. The email service may not support a review of the advertisement email message from the user interface. Instead, the user interface may provide an option to the user for deleting the advertisement email message or for forwarding such message to another or alternate email address of the user.

In addition to summarizing email messages of different formats into a common format and marking other email messages as unrelated to a particular activity, the above email service may provide further functionalities. As further described herein below, these functionalities may include facilitating access to and storage of the email messages, storage of the summaries, responses to the entities, updates to user profiles, updates to entity profiles, and/or update to item trends.

In the interest of clarity of explanation, the various embodiments are described herein using the context of ordering items from entities as an example of a particular activity for which an email service is configured and implemented. However, the embodiments are not limited as such and may similarly apply to other types of activity and/or contexts within the activity. For example, email messages may be processed and summaries may be generated and presented for different types of context associated with ordering items. Examples of such context types may include orders, items, item types, entities, entity types, status types, and/or other contextual information relating to item orders. As used herein, ordering an item may represent an example activity and may include purchasing, acquiring, obtaining, leasing, renting, returning, borrowing, and/or other activities that may be applicable for receiving, sending, or exchanging the item between two or more users, two or more entities, and/or one or more users and one or more entities.

Turning to FIG. 1, the figure illustrates an example of a computing environment for providing an email service tailored to the activity of ordering items (and, similarly, to other activities). The computing environment may include an email server 110, a user device 120, and entity devices 130A-K in communication over, for example a data network (e.g., a public network such as the Internet and/or a private network such as an intranet). Although FIG. 1 illustrates a single email server 110 and a single user device 120, the computing environment may similarly include a larger number of such server and device. Generally, the email server 110 may host an email box 112 for a user of the user device 120 (and, similarly, for other users). As such, the email server 110 may represent a computing system having a storage location for storing email messages and summaries having processing capability to process the email messages and summaries (e.g., to implement an email service). The email box 112 may represent a portion of the storage location committed or dedicated to the user such that email messages and summaries addressed to the user may be stored in that portion of the storage location. The email box 112 may be accessible to the user via a user interface 124. For example, the user may operate the user device 120 to access the email box 112 via the user interface 124. The user interface 124 may be a web page interface or an application interface. The email box 112 may be identified via an email address specific to the user. For example, the email address may have a local part that identifies the name of the email box 112 and a domain part that identifies a domain. The local part, and equivalently the name of the email box 112, may be unique to the user. The domain part may be common to all email addresses that the email server 110 manages.

Entities may operate the entity devices 130A-130K to send email messages to the user at the email address. Some of the email messages may relate to items that the user may have ordered from the entities. Ordering the items may be accomplished online (e.g., over a data network), offline (e.g., the user walking into a brick and mortar store of an entity), or through a combination of both. Other email messages may not relate to such orders. Instead, these email messages may include, for example, advertisements, discounts, surveys, and other notifications unrelated to the orders. Regardless, each of the sent email messages may use a format specific to the respective entity. Thus, the email messages sent from the different entities may have variable formats. As illustrated in FIG. 1, an "entity A" may operate an entity device 130A to send an email message 132A in a "format A" to the user's email address. Similarly, "entity B" through "entity K" may operate entity device 130B through entity device 130K, respectively, to send email message 132B in format B through email message 130K in format K, respectively, to also the user's email address. "Formats A, B, and C" may be different from each other. For example, the email message 132A may have a subject line and descriptions of an ordered item "from entity A" and a status of such an order in a unique format to "entity A." In comparison, either or all of "entities B through K" may use other unique formats.

The email server 110 may receive the email messages 132A-K. In an example, the email server 110 may store these messages. The email messages 132A-K may be stored in the email box 112 of the user and/or in some other storage location of the electronic mail server 110. In another example, the storage may be temporary for a period of time. The period of time may be predefined (e.g., storage for two months). Additionally or alternatively, the period of time may correspond to processing the email messages 132A-K and generating the corresponding summaries such that, once the summaries are generated, the email messages 132A-K may be deleted and/or forwarded to another storage location or server.

In the illustrative example of FIG. 1, the received email messages 132A-K are stored as email messages 114 in the email box 112 of the user. Summaries 116 are generated out of the email messages 114 and stored in the email box 112. Once the summaries 116 are stored, the email messages 114 may be optionally removed from the email box 112.

The email server 110 may process the email messages 114 to generate the summaries 116. For example, the email server 110 may implement a summary service 122. The summary service 122 may be an integrated part of, a plug-in to, or an extension of the email service of the email server 110. The summary service 122 may be configured to access and parse the email messages 114 to categorize or mark the email messages 114 as being related or unrelated to ordered items. Unrelated email messages may be moved to a non-order folder of the email box 112. The related email messages may be moved to an order folder of the email box 112. The summary service 122 may generate the summaries 116 from the related email messages. The summaries may follow a common format.

In an example, the common format may specify a set of common fields that should be used in each or some of the summaries 116. Accordingly, the summary service 122 may parse a related email message to identify the relevant information and populate the fields of a respective summary with the relevant information. If information for a particular field is not found in the related email message, the summary service 122 may locate, request, and receive this information from another source.

The email server 110 may also configure the user interface 124 such that the user may access the summaries 116 from the electronic mail box and, optionally, the messages 114. The user interface 124 may present the summaries 116 generated by the summary service 122. For example, the user interface 124 may list the summaries 116 as summaries 126 and allow a sorting, filtering, or organization of such fields along some or all of the fields. Upon a selection of a selection of a particular summary from the summaries 126, the user interface 124 may be refreshed to expand and present the particular summary. In addition, the user interface 124 may provide an option to view the non-order folder. If selected, the user interface 124 may display the list of the unrelated email messages.

In an example, the user interface 124 may be configured to provide limited or specific functionalities to the user. Such functionalities may be set according to the desired activity (ordering item) and may help avoid using the email box 112 for other activities. For example, the email server 110 may set up the user interface 124 for read only access. As such, the user device 120 may be able to read the summaries 116 and, optionally, the email messages 114 from the email box 112 but may not be able to write new summaries to the email box 112 or write and send new email messages to the entities. In another example, the email server 110 may set up the user interface 124 to provide a forward button and an action button. The forward button may be used to forward summaries and/or email messages to another or alternate email address of the user. The action button may initiate a response to an entity. For instance, upon a selection of an action button in association with a particular summary, the email server 110 may automatically generate and send (without additional user input) a response email message to the respective entity.

The email server 110 may implement the summary service 122 to provide the various email functionalities described herein. Doing so may provide various advantages. For example, a user registration with the summary service 122 may be sufficient to provide the user with an email address and apply the email functionalities to email messages received at the email address. Hence, the user may need not review the email messages, identify which particular email messages should be summarized, and forward the particular email messages to a computing service of a third party, wherein the computing service may in turn may generate summaries. In addition, even if the computing service may automate the review, selection, and forwarding process, the process nonetheless would necessitate and rely on authentication and messaging protocols between the email service and the computing service. In comparison, the embodiments described herein may remove such need and reliance on protocols, thereby reducing the amount of memory and processor usages. When the email server 110 is used in connection with an electronic platform configured to offer items to users, the summary service 122 may also augment or enhance the overall experience. As further described below, user interests, popularities of items, and popularities of entities, may be determined from the email messages. This information may be used for offering items of interest to users, adding popular items to a catalog of the electronic platform, or adding popular entities as merchants of the electronic platform.

Although FIG. 1 illustrates an example email service configured for generating summaries of orders, the embodiments described herein are not limited as such. Instead, the embodiments may be similarly applied to other types of activities. In addition, the summaries may be generated, updated, and/or organized based on different contextual information for an activity.

Figure 2:
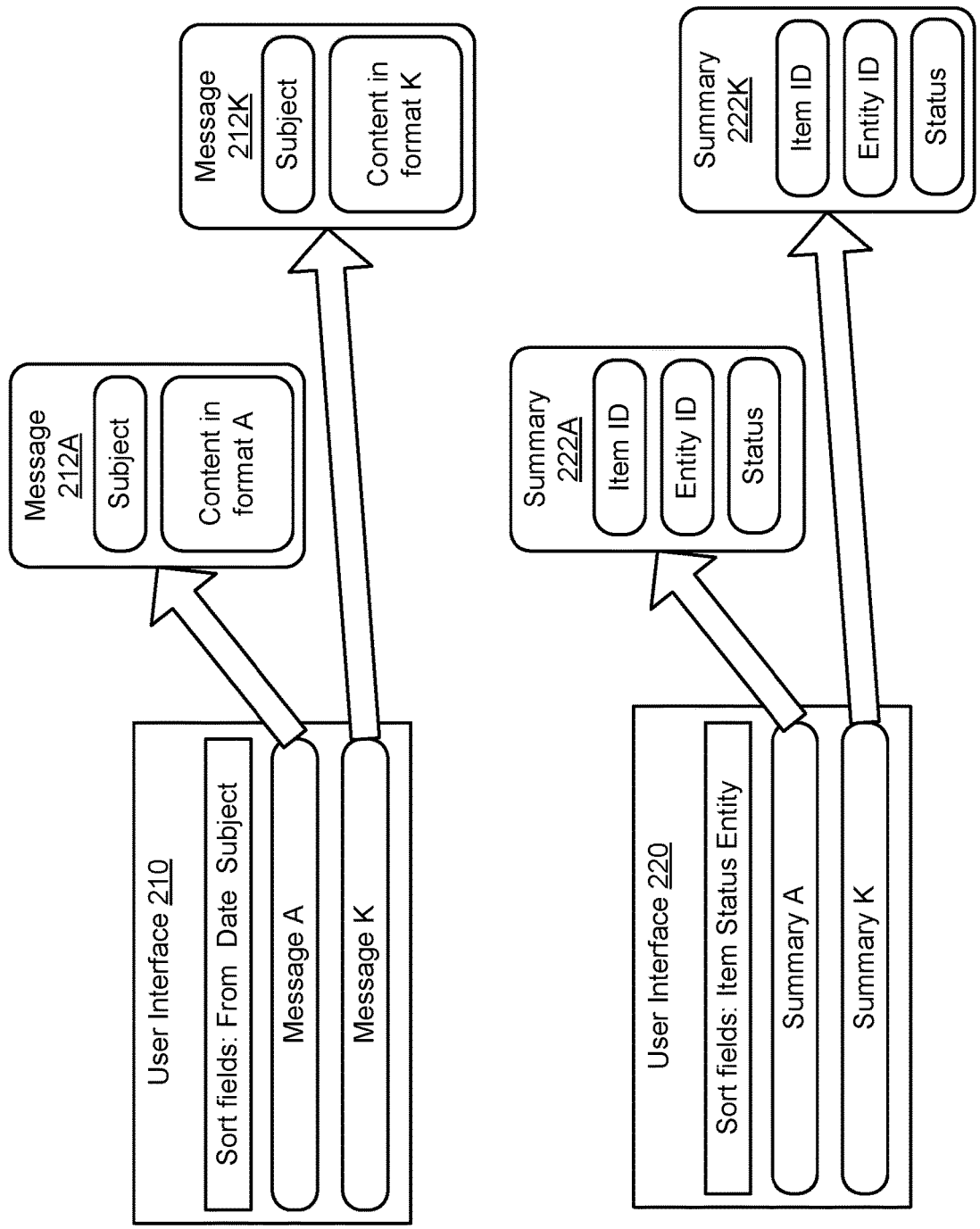
FIG. 2 is a block diagram illustrating an example comparison between user accesses to email messages, according to embodiments.

Turning to FIG. 2, the figure illustrates a comparison between two user interfaces to an email box. The user interface 210 may represent a more traditional web page interface or application interface for accessing email messages. In comparison, the user interface 220 may represent a specific web page interface or application interface for accessing summaries of email messages relating to ordering items (and, similarly, other activities and contexts such as email messages relating to all orders from a particular entity, for a particular entity type, for a particular item type, and/or having a particular status).

The user interface 210 may list different email messages (illustrated in FIG. 2 as "email messages A through K"). The list may be sorted according to different fields, such as from (e.g., the sender), date, and subject of email messages. In the illustration of FIG. 2, assume that "email message A" is sent by an "entity A" and "email message K" is sent by a different "entity K." Upon a user selection of "email message A," the user interface 210 may be refreshed to present the actual email message, illustrated in FIG. 2 as email message 212A. The presentation of the email message 212A may show the subject and content of the email message 212A. Because the email message 21A was sent by "entity A," the subject and/or content may have a format specific to "entity A." For example, the content may start with the first name of the user, followed by a short text description of an ordered item, an image of the item, an order number, and conclude with an order status. Likewise, "email message K" may be selected and presented, illustrated in FIG. 2 as email message 212K. However, the email message 212K may use a different format that may be specific to "entity K." For example, the content may not name the user, may start with an order number, followed by an identifier of the item, and conclude with a tracking number.

On the other hand, the user interface 220 may provide standardized summaries (e.g., summaries that use a common format). For example, the user interface 220 may list the different summaries (illustrated in FIG. 2 as "summaries A through K") corresponding to the "email messages A through K." The summaries may be sorted according to different fields, where these fields may be found in the summaries. For example, these fields may include an identifier of an entity, an identifier of an item, an order date, an order number, an order status, a payment confirmation, a delivery date estimate, and/or a return option. Upon a summary message, illustrated in FIG. 2 as summary 222A. The presentation of the summary 222A may show the populated fields. As illustrated in FIG. 2, the actual item identifier (e.g., an image, a title, and/or a universal product code (UPC)), the actual entity identifier (e.g., a name, and/or address of the entity), and the order status (e.g., payment completed, item in delivery transit, estimated delivery, and/or item in return transit) may be listed for the ordered item identified in "email message A." Likewise, "summary K" may be selected and presented, illustrated in FIG. 2 as summary 222K. In this case, the summary 222K may follow the same format as the summary 222A despite that the email messages 212A and 212K use different formats. For example, the summary 222K may also list the actual item identifier, actual entity identifier, and order status for the ordered item identified in "email message K."

Hence, the user interface 220 may enhance the quality and efficiency of communicating information about ordered items (and, similarly, other activities). The enhancement may result from standardizing the presented information into relevant fields across the summaries.

The above features of the user interface 220 are provided for illustrative purposes. Additional functionalities of the email serviced described herein may also be provided through the user interface 220 or similar user interfaces.

Figure 3:
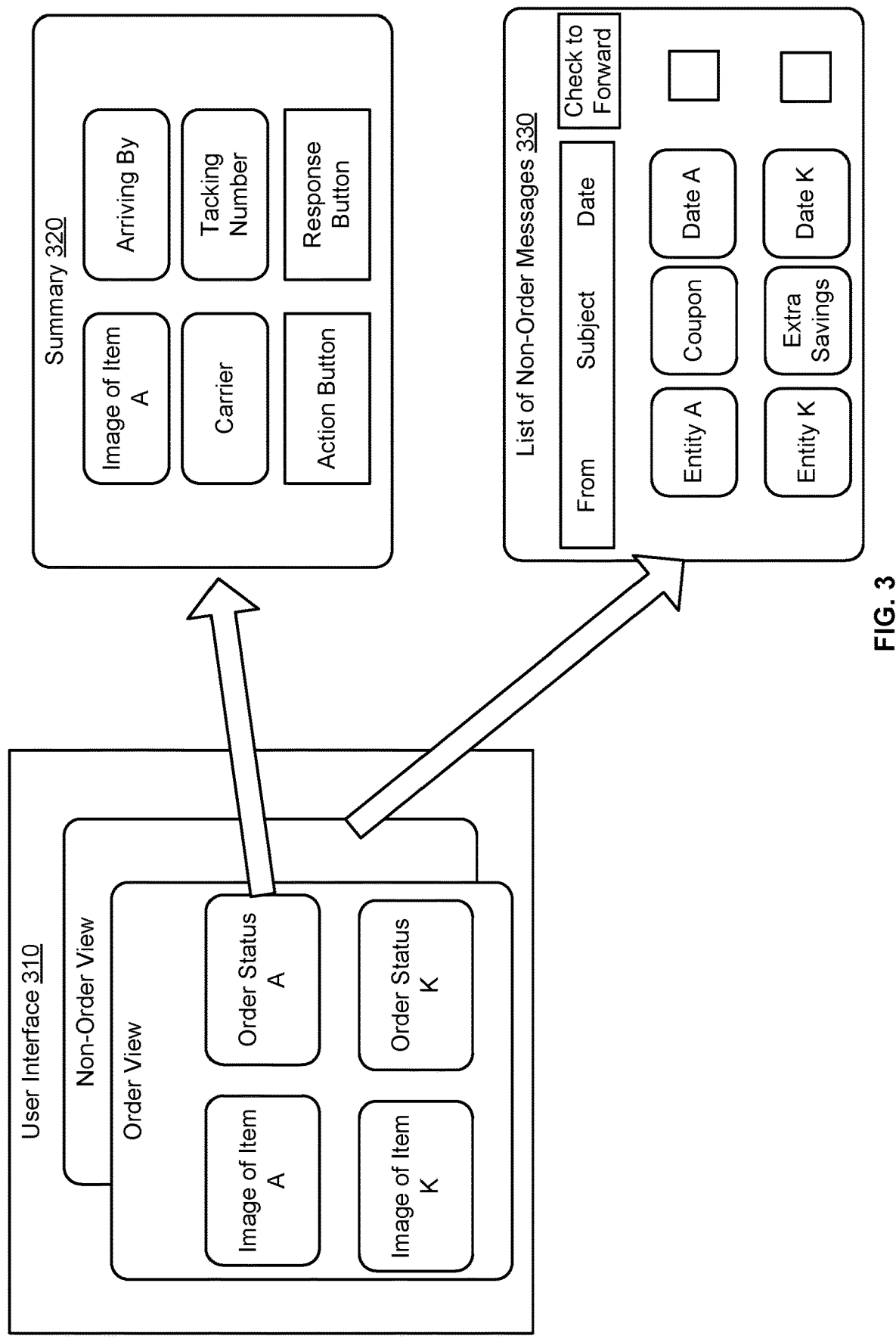
FIG. 3 illustrates an example user interface for accessing summaries of email messages, according to embodiments.

FIG. 3 illustrates an example of providing such additional functionalities. These functionalities may include summarizing email messages that may relate to ordered items, while avoiding such summaries for other email messages. Read only access to the summaries may also be provided. Alternatively, or additionally, for email messages that relate to the ordered items, full or partial email messaging functionalities may be provided. For instance, the read only access may be supplemented with an action button and a response button. In another illustration, the access may be instead read and write access to enable full email communications for the related email messaged. On the other hand, access to the unrelated email messages may also be provided. However, the access may be limited to viewing the list of unrelated email messages and, optionally, forwarding or removing the unrelated email messages. Providing a read only access and particular additional functionalities (e.g., action, response, forward, remove functionalities) may incentivize users and entities to use the email service for the particular activity (e.g., ordering items) rather than a general email service for all kind of activities (e.g., for general communications between any parties).

As illustrated, a user interface 310 may organize information about received email messages into different views. For example, an "order view" may be used to list different summaries of email messages that may relate to ordered items (and, similarly, other activities and contexts such as email messages relating to all orders from a particular entity, for a particular entity type, for a particular item type, and/or having a particular status). Similarly, a "non-order view" may be used to list all other email messages. Of course, a different number of view may be used, where each view may list email messages and/or summaries for a particular activity or context or may be used as a catch all view for unrelated email messages or for irrelevant (e.g., SPAM, junk) email messages.

The order view may list the summaries in an organization that may enhance the user experience and the quality and efficiency of information communication. In an illustration, the organization may represent a dashboard or a synopsis of statuses of ordered items. For example, each summary may be listed in the order view using an image, a title of the item, and/or an order status. Upon a selection of a summary (e.g., a user tap or a mouse click over the image, title, and/or order status), the user interface 310 may be refreshed to present the populated fields of the summary, illustrated in FIG. 3 as a summary 320. The user interface 310 may also presented additional functionalities that may be applicable to the summary. For example, the summary 320 may show the image of the item, the estimated delivery date, the carrier delivering the item, and/or a tracking number of the item. Of course, other fields may be presented depending on the order status. For instance, if the item is being returned, an estimated return date may be shown instead of the estimated delivery date.

In addition to the populated fields, buttons that relate to the additionally applicable functionalities may also be shown. For example, an action button and a response button may be presented. The action button may initiate an action that may be dependent on the order status. For instance, if an item has not been shipped yet, the action button, when selected, may initiate a shipment cancellation. In comparison, if an item is already in transit or was delivered, the action button may initiate a return process. In comparison, the response button may initiate a communication with the respective entity. The communication may also be dependent on the order status. For example, if an item has not been shipped yet, a user selection of the response button may automatically generate and send an email message to the entity requesting an update about the start of the shipment or the estimated delivery date.

Other buttons or functionalities may also be possible. For example, the summary 330 may contain a link to the original email message. The link may be set-up as a separate button or may be part of any of the presented fields. Upon a selection of the link, the user interface 310 may be refreshed to present the original email message. Alternatively or additionally, the original email message may be presented in a different user interface (e.g., in a web page pop-up). Similarly, a forward button may be provided in the user interface 310 to forward the original email message to another or alternate email address of the user.

On the other hand, a user selection of the non-order view may result in a refresh of the user interface 310 to present the list of the unrelated email messages, illustrated in FIG. 3 as the list of non-order email messages 330. The list may be organized according to various sort fields, such as from (e.g., the entity sending an email message), the subject (e.g., as found in the email message or as identified by the email service based on a parsing of the email message), and/or the date of the email message. The access of the user to these email messages may be limited, such as the user may not be able to select and review the content of an unrelated email message from the user interface 310. Instead, a forward button may be provided in the user interface 310. Upon a selection, the forward button may initiate a process to forward the unrelated email message to another or alternate email address of the user. In addition, the user interface 310 may provide a remove button. Upon a selection of such a button, the unrelated email message may be deleted from the non-order view.

Some or all of the above additional functionalities may be automated and may not need a user selection. For example, rules for forwarding and removing email messages (whether related or not to an ordered item) may be generated from user settings of the email box. The email service may apply such rules to automate the functionalities. In an illustration, a user setting may indicate that a related email message should be automatically forwarded to another or alternate email address of the user and should be deleted from the email inbox within a predefined period of time (e.g., two weeks) from receipt. Another user setting may indicate that an unrelated email message should be automatically deleted. As such, the email service may automatically forward all related email messages, delete such messages within the time period from receipt, and delete all unrelated email messages.

Figure 4:
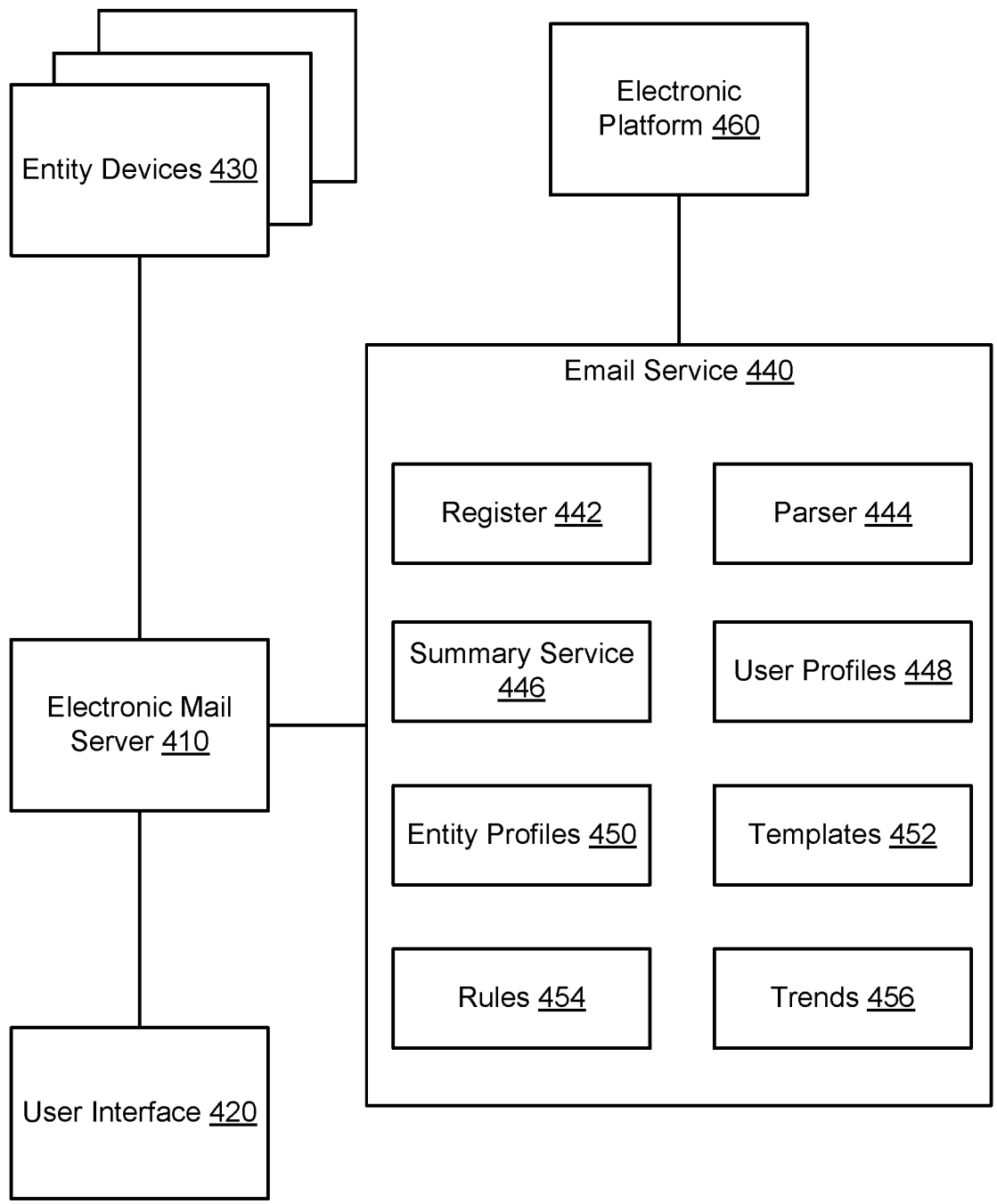
FIG. 4 illustrates an example computing environment for providing an email service within the context of an electronic platform, according to embodiments.

Turning to FIG. 4, the figure illustrates an example computing environment for providing an email service tailored to ordering items (and, similarly, other activities). The email service may be provided within the context of an electronic platform that may also offer items for ordering. Because of the overlap between what the email service is tailored for and the item order functionality that the electronic platform may facilitate, the overall quality of service of the electronic platform may be enhanced.

As illustrated, the example computing environment of FIG. 4 may include an email server 410 that may provide access to an email box via a user interface 420. The example computing environment may also include entity devices 430. Various entities may be operate the entity devices 430 to send email messages to an email address that identifies the email box. Some or all of these components may be similar to the email server 110 and entity devices 130A-K of FIG. 1.

In addition, the example computing environment may include an email service 440. The email service 440 may be implemented as specialized computing hardware or as a computing service hosted on a computing system. Further, the email service 440 may be integrated with (e.g., hosted on) the email server 410, or, an interface (e.g., an application program interface (API)) may exist between the two.

Similarly, the email service 440 and/or the email server 410 may be integrated or interface with an electronic platform 460. The electronic platform 460 may represent a network of computing resources for providing, for example, an electronic marketplace. To offer items for ordering from the electronic marketplace, the electronic platform 460 may maintain a catalog of the items. An offer for an item may be defined in a catalog page. For example the catalog page may include information about the item, a price, a delivery method, and source of the item. On the front end, the electronic platform 460 may also provide a web site to a user to access the catalog. Web pages of the web site may be generated from the catalog pages. On the back end, the electronic platform 460 may rely on an inventory management system. The inventory management system may be configured to manage the inventorying of items in storage spaces of the electronic marketplace. For example, the inventory management system may output plans to acquiring units of items and storing these units in the storage spaces on a periodic basis.

Turning to the details of the email service 440, the email service 440 may implement various components including, for example a register 442, a parser 444, and a summary service 446. Some or all of these components may be integrated. The register 442 may be configured to register users. Registering a user may include receiving personal user information, setting up an email box, generating an email address, and configuring user settings for the email box and email address. The user settings may include a particular activity the user may be interested in (e.g., "show me ordered items") and/or particular context of the activity (e.g., "show me ordered items from a particular entity"). The user settings may also include user preferences about actions that relate to email messages (e.g., forwarding the email messages to another or alternate email of the user). Further, the user settings may indicate a desired format for the summaries (e.g., the fields of the summaries for presentation to the user). The register 442 may generate user profiles 448 for the registered users based on the respective information. Similarly, the register 442 may register entities and generate entity profiles 450. Registering an entity may be accomplished for different reasons. For example, an entity may describe the line of business that the entity is in, the types of email messages the entity sends to users, and or any template that the entity may use per type of email message. A template may specify the format (e.g., the different fields and the organization of the fields, if any) for the email message type. The register 442 may store the received templates as template 452. The register 442 may also generate and store rule 454 based on user settings and entity settings. For example, a rule may specify conditions for forwarding an email message to another or alternate email address of the user. Such an address may be stored in the user profile. In another example, a rule may specify a workflow to initiate a response and/or an action with an entity and the format of such response or action.

The parser 444 may be configured to parse the email messages. The parsing may identify whether an email message may be related to ordering item or not. The parsing may also identify the different relevant information from the email message. For example, the parsing may extract values (e.g., alphanumerical characters, graphics, or other values) from the description (e.g., the body and/or the subject line) found in the email message. In an example, the parsing may apply text detection, optical character recognition (OCR), image processing, and pattern recognition techniques. If a template exists for the email message, the parser 444 may also use the template to parse the email message. For instance, if the template identifies a particular field (e.g., a nine digit tracking number), the parser 444 may look for that particular field in the email message.

The summary service 446 may be configured to generate summaries from email messages, mark email messages as being related or not to ordered items (or any other categorization), and/or move the email messages to the appropriate folders of the email box. The summary service 446 may do so based on the output of the parser 444. In addition, the summary service 446 may use this output to update the user profiles 448, the entity profiles 450, the templates 450, and the rules 454. For example, the summary service 446 may identify an interest of a user over time based on the email messages sent to that user. The respective user profile may be updated to add that interest. Similarly, a popularity of an entity may be determined based on the number of email messages that relate to ordered items from the entity across the user base. The respective entity profile may be updated to reflect the popularity. Similarly, the summary service 446 may determine trends for items based on what items may be have been ordered. This information may be extracted from the email messages. The summary service 446 may store the trends as trends 456. In another example, the summary service 446 may be configured to filter email messages. The filtering may be based on the user settings. For instance, the email messages may be marked as being related or not to ordered items. The filtering may also be based on the entity settings. For instance, if an entity has a history of sending SPAM email messages, email messages sent from that entity may be marked as SPAM. Further, the filtering may be based on a history of email messages sent to the email address of the user. For instance, if the user is associated with a pattern of not viewing summaries corresponding email messages sent from a particular entity, such email messages and subsequent email messages from the entity may be marked as SPAM. In addition, the filtering may be based on content of the email messages. For instance, the summary service 446 may maintain or have access to a blacklist of terms based on a history of email messages and reactions of the user and/or other users. If content of an email message contains terms from the blacklist at a frequency that exceeds a threshold, the email message may be marked as SPAM.

In turn, the electronic platform 460 may subscribe to the various information available from the email service 440. For example, the electronic platform 460 may receive via an API with the email service information from the user profiles 448 (e.g., interests of the users), information from the entity profiles 450 (e.g., popularity of the entities), and information about the trends 456. The inventory management system of the electronic platform 460 may consume such information to improve the quality of service of the electronic marketplace. For example, the inventory management system may generate plans to inventory popular items that may not already be offered from the electronic marketplace and/or to invite entities such that these entities may offer items through the electronic marketplace. In addition, items that may meet the interest of the users and that may be available from the electronic marketplace may be recommended to the user.

Figure 5:
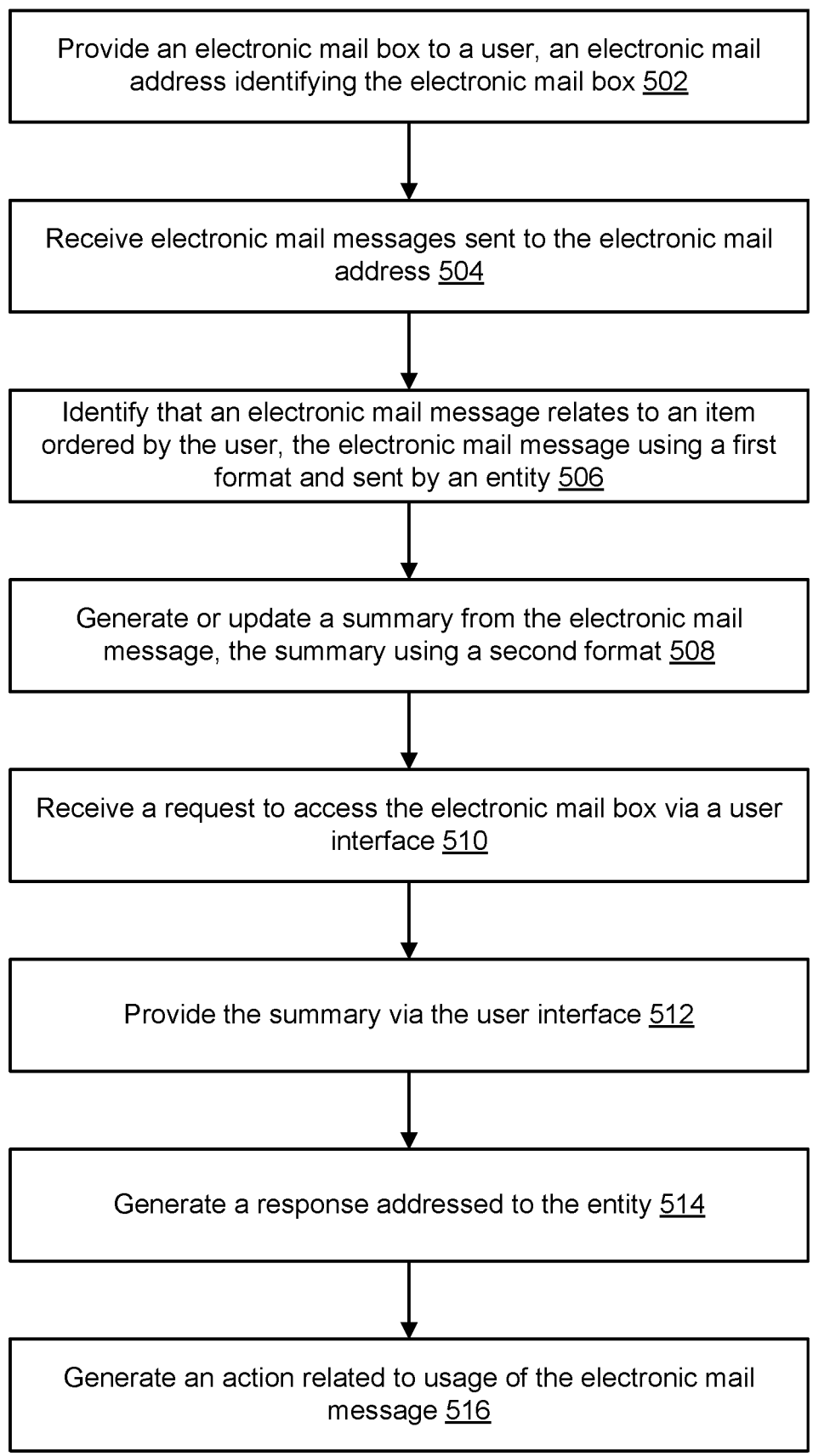
FIG. 5 illustrates an example flow for generating summaries of email messages, according to embodiments.
Figure 6:
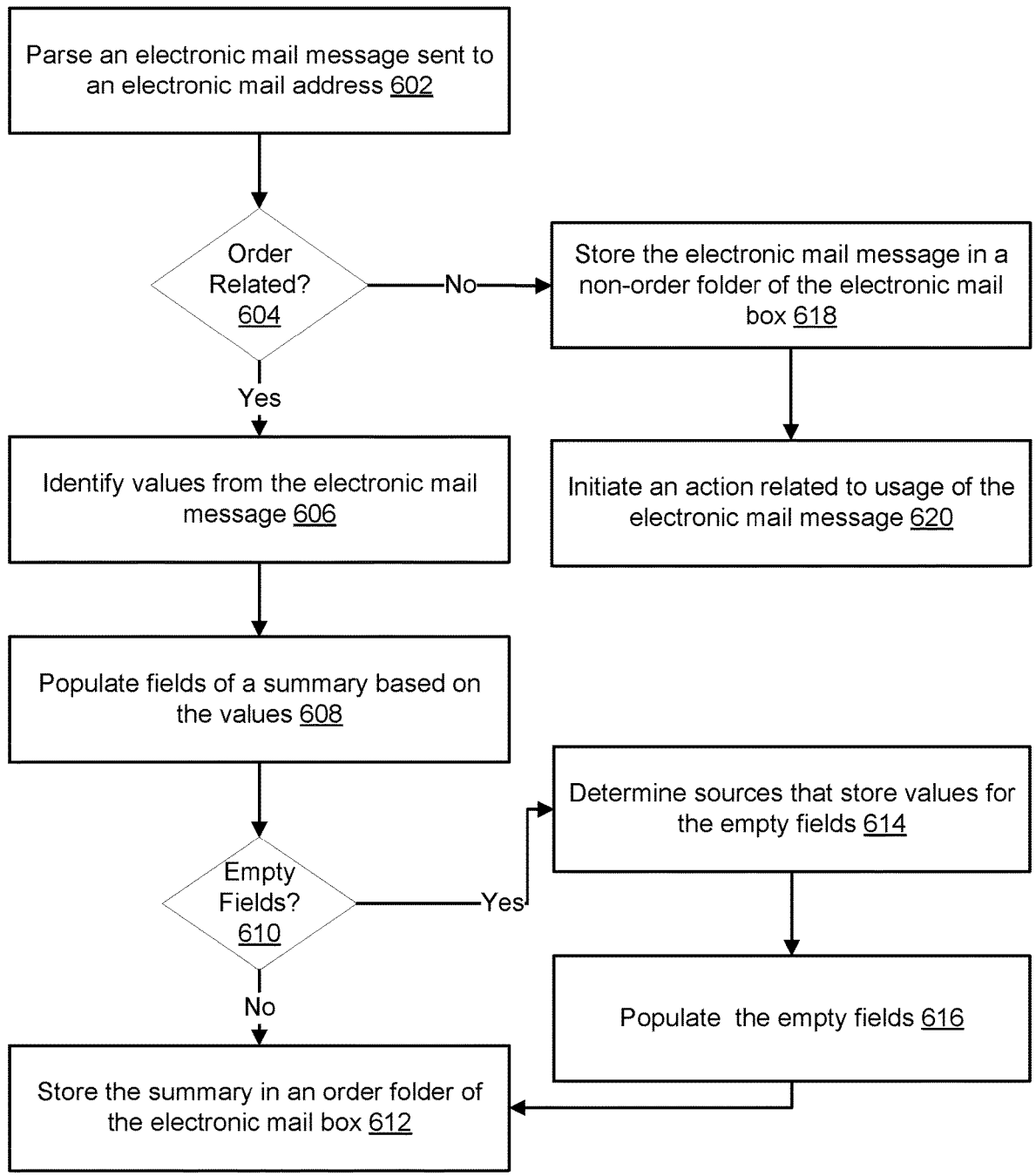
FIG. 6 illustrates an example flow for generating summaries of email messages and marking other email messages based on a particular activity type, according to embodiments.
Figure 7:
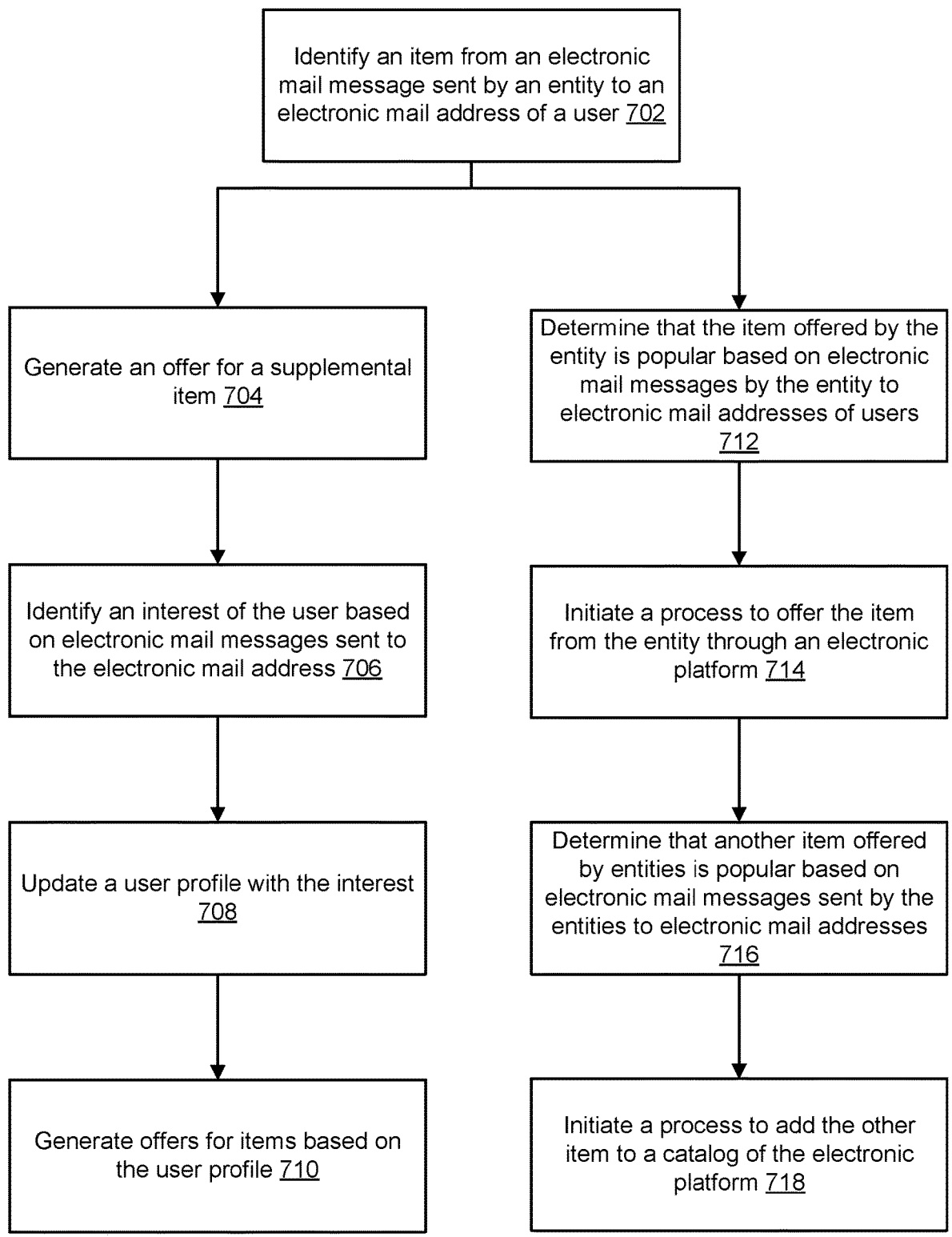
FIG. 7 illustrates an example flow for providing data to an electronic platform based on email messages, according to embodiments.

Turning to FIGS. 5-7, the figures illustrate example flows for providing an email service in association with ordering items (and, similarly, other activities). In particular, FIG. 5 illustrates an example flow for generating summaries of email messages. In comparison, FIG. 6 illustrates an example flow for generating summaries of email messages and marking other unrelated email messages. FIG. 7 illustrates an example flow for providing data to an electronic platform based on email messages. Some operations across the example flows may be similar. Such similarities are not repeated herein in the interest of clarity of explanation. In the interest of clarity of explanation, the example flows are illustrated in connection with processing email messaged related to item orders. However, the example flows similarly apply to other activities and/or activity contexts.

In the illustrative operations, some of the operations or functions may be embodied in, and fully or partially automated by, components executed by one or more processors. For example, an email service, such as the email service 440 of FIG. 4, may be configured to perform some of the operations. In addition, while the operations are illustrated in a particular order, it should be understood that no particular order is necessary and that one or more operations may be omitted, skipped, and/or reordered.

Turning to FIG. 5, the example flow may start at operation 502 where an email box may be provided to a user. An email address specific to the user may identify the mail box. In an example, the email service may provide the email box may by registering the user and configuring the email address and the email box based on information received from the user through the registration process.

At operation 504, email messages may be received at the email box. The email messages may be sent by different entities. These entities may address the email messages using the email address specific to the user. Each email message may use a format specific to the sending entity. In an example, the user may conduct online and/or offline activities to order items. As part of these activities, the user may give the email address to the various entities. In addition, the various entities may acquire the email address from a third party.

At operation 506, an email message of the sent email messages may be identified as relating to an item ordered by the user. The electronic message may have been sent by a particular entity and may follow a format specific to that entity. In an example, the email service may parse the description from the email message (e.g., the subject line and body of the email message) to identify that the message may be related to an ordered item. For instance, the email service may look for an order number, a payment confirmation, a delivery estimate, a tracking number, a return number, or any other information indicative of an order. If found, the email service may mark the email message as being related to an ordered item. Otherwise, the email message may be marked as being unrelated.

The identification may be performed for all the received messages. This may be performed in bulk on a periodic basis. Alternatively or additionally, the email service may mark an email message as soon as the email message is received in the email box. Email messages marked as being unrelated to any ordered item may be moved to a non-order folder of the email box. In comparison, email messages related to ordered items may be moved to an order folder of the email box.

At operation 508, a summary may be generated or updated from the email message that may have been identified as related to the ordered item. The summary may have a format that is different from the format of the email message. The summary's format may be a common format used to summarize all email messages. For instance, this common format may be the format that an electronic platform may use to report statuses of ordered items and may specify different order status-related fields. In an example, the email service may generate the summary by parsing the email message to identify information usable for the fields, and accordingly populate these fields. Once generated, the email service may store the summary in, for example, an order folder of the email box. In another example, the email service may update an existing summary for a particular order by parsing a second email message. The summary may have been generated from a first email about the particular order. The second email message may also relate to the same order.

At operation 510, a request to access the email box may be received via a user interface. For example, the email service may receive this request from a computing device of the user displaying the user interface.

At operation 512, the summary may be provided via the user interface. For example, the email service may refresh the user interface to present some populated fields of the summary within a list of summaries. If the summary is selected, the email service may refresh the user interface to expand the summary and present a larger number if not all of the populated fields of the summary.

At operation 514, a response addressed to the entity may be generated to support specific user-based functionalities. For example, in conjunction with presenting the summary, the email service may refresh the user interface to also present a response button. A user selection of the response button may trigger the email service to automatically generate the response as an email message and send this email message to an email address of the respective entity. The format of the response may use a template available for the entity. The content of the response (e.g., sender address, recipient address, subject line, and body) may be populated from the respective user profile and entity profile, the summary, and/or the original email message.

At operation 516, an action related to usage of the original email message may be generated to support additional specific user-based functionalities. The action may include deleting and/or forwarding the original email message to another or alternate email address of the user. For example, in conjunction with presenting the summary, the email service may refresh the email service to also present an action button. A user selection of the action button may trigger the email service to automatically initiate the action. Additionally or alternatively, the email service may automatically initiate the action absent an action button and/or a user selection of the action button. Instead, the email service may do so based on rules specifying actions to be performed given a set of conditions. The email service may determine what action to perform based on the user profile, the entity profile, the rules, and/or the user selection of an action button.

FIG. 6 illustrates a more detailed example flow for processing an email message to either generate a summary or mark the email message as unrelated to an order for an item (and, similarly, other activities). The example flow may start at operation 602, where an email message sent to an email address may be parsed. In an example, the email service may perform text detection, OCR, image processing, pattern recognition, and/or other parsing techniques to identify the different information contained in the email address. The email service may identify an entity that sent the email message from, for example, the "From" field (e.g., the sender field) or from the body of the email message. The email service may look up an entity profile and determine a template that the entity may have used for the email message. If a template exists, the email service may parse the email message using the attributes specified in the template. If the template does not exist, the email service may track the type of information (e.g., the type of attributes) extracted over time from email messages sent by the entity, identify a pattern of attribute types, and generate and store a template for that entity for future parsing.

At operation 604, a determination may be made as to whether the email message may relate to an ordered item or not. In an example, the email service may search for order specific information from the parsed information. This search may include a text search for text typically used to describe orders. If a template exists, the search may look for a specific order attribute. Additionally or alternatively, the email service may use similar search techniques to look for information that may indicate that the email message may be an advertisement, a coupon, a discount, or some other non-order related email message. If the email address is order-related, operation 606 may be performed. Otherwise, operation 618 may be performed.

At operation 606, values from the email message may be identified based on the parsed information. These values may be used to populate fields of a summary of the email message. These fields may be specified according to a common format of the summary. In an example, the email service may determine the fields from the common format and extract from the parsed information the values that match these fields. For instance, if a field is an order number, the email service may search alphanumerical value from the parsed information that may be titled order number. Similarly, if a field is an image field, the email service may search for a graphic object from the parsed information.

At operation 608, fields of the summary may be populated with the values. For example, the email service may add the values to the matched fields of the summary. Some of the values may be customized based on the ordered item. Customization information may be derived from the email message. For instance, if an order item has a particular color, that color value may be shown in a color field. Similarly, an image field showing the item may be populated with an image of the item in that color.

At operation 610, a determination may be made as to whether any of the summary's fields may remain empty upon completion of operation 608. An empty field may indicate that the respective value may not have been found in the email message. Operation 614 may be accordingly performed. On the other hand, if no field remains empty, then all of the summary's fields may have already been populated. Accordingly, operation 612 may be performed.

At operation 612, the summary may be stored in the email box. For example, the email service may store the summary in an order folder of the email box. In comparison, at operation 614, one or more empty fields may be empty. Accordingly, one or more sources storing values for such fields may be determined. A source for an empty field may be identified using various techniques. Some of the techniques may depend on the empty field. In addition, an empty field may not be populated if a respective source is not identified or is inaccessible, or if using the source results in a potential error. In an example, the email service may identify a link to a source in the email message and may use a web crawler to follow the link and obtain the missing value. Similarly, the email service may use the web crawler to visit a web site of the respective entity and obtain the missing value. Yet in another example, if the missing value is available from an electronic platform or a third part, the email service may use the web crawler to retrieve the missing value from such sources. In an illustration, the empty field may be an image field. The email service may have identified the item and features of the item (e.g., ordered color). The email service may identify a storage location at the electronic platform where an image of the item in that color may be stored. The email service may reference the storage location in the image field by inserting, for instance, the respective uniform resource locator (URL). Hence, when the summary is presented at a user interface, the image may be rendered based on the URL.

At operation 616, the one or more empty fields may be populated. For example, the email service may retrieve the one or more missing values from the one or more source and add these values to the one or more empty fields. Operation 616 may be followed by operation 612, where the summary may be stored.

Referring now to operation 618, the email message may have been determined as not being related to an ordered item. Accordingly, the email message may be stored in a non-order folder of the email box at operation 618. For example, the email service may move the email message to this folder.

At operation 620, an action related to usage of the email message may be initiated. The action may include deleting and/or forwarding the 1 email message to another or alternate email address of the user. For example, the email service may present an action button for deleting and/or forwarding the email message. Additionally or alternatively, the email service may automatically initiate the action based on rules specifying actions to be performed given a set of conditions.

Although the example flow of FIG. 6 is illustrated in connection with a single email message, the example flow may be similarly implemented for a plurality of email messages. The processing of such messages may be performed in bulk (e.g., on a periodic basis or upon a request of the user to access the email box) or immediately after receiving each email message. In both cases, a summary may be generated or updated also based on multiple email messages. For example, if an entity sends two (or a larger number of) email messages within a period of time (e.g., a couple of days) about the same item order to the email address, the email service may generate or update the summary by merging information from both email messages. In particular, the email service may populate the fields from the content of both email messages. For instance, if the first email message includes a payment confirmation and the second email message includes a tracking number, the email service may generate a summary that includes both the payment confirmation and the tracking number. In another example, if two (or a larger number of) entities send email messages within a predefined period of time (e.g., a couple of hours) about the same item order to the email address, the email service may generate or update the summary by merging information from these email messages, such as by populating the fields from the content of both email messages. This may be the case when, for instance, the entity providing the item sends a first email message about the ordered item and a third party handling the payment may sends a second email message about the payment confirmation.

FIG. 7 illustrates an example flow that may be implemented in connection with an electronic platform configured to facilitate an electronic marketplace. The example flow may be used to improve the quality of service of the electronic marketplace.

The example flow may start at operation 702, where an item may be identified from an email message sent by an entity to an email address of the user. For example, the email service may parse the email message to identify the item. The item's identifier may include a title, a description, an image, a UPC code, and/or some other unique item identifier.

At operation 704, an offer for a supplemental item may be generated. For example, the email service may provide the item's identifier to a recommendation engine of the electronic marketplace via an API. The recommendation engine may identify a supplemental item that may supplement a feature of the item. For instance, if the item is a cell phone, the recommendation engine may recommend a protective case. The offer may be generated from a catalog page of the supplemental item. The offer may be sent to the email address or to another or alternate email address of the user or may be presented on a web page of the electronic marketplace when the user visits such a web page.

At operation 706, an interest of the user may be identified based on email messages sent to the email address. For example, the email service may determine that, over time, the email messages received in the email box may relate to a particular type of ordered items (e.g., diaper purchases over time). If the number of such email messages exceed a threshold, or if a particular pattern is detected, the email service may identify an interest of the user in that type of items.

At operation 708, a user profile of the user may be updated based on the interest. For example, the email service may add information about the interest to the user profile. Additionally or alternatively, the email service may send such information via an API to a computing service of the electronic platform, where the computing service may be configured to maintain user profiles.

At operation 710, offers for items may be generated based on the user profile. For example, the recommendation engine of the electronic marketplace may identify the interest from the user profile and may generate offers for items that match this interest from the respective catalog pages. The offers may be sent to the email address, another or alternate email address of the user, or presented on a web page of the electronic marketplace.

At operation 712, a determination may be made that the item offered by the entity is a popular item. This determination may be made based on email messages sent by the entity to email addresses of the users, where the email messages may relate to orders for the item by the users from the entity. The email addresses may have the same domain part associated with the domain name that implements the email service. In an example, the email service may determine the item's popularity by identifying that the number of the users (or, similarly, the email messages) may exceed a threshold.

At operation 714, a process to offer the item from the entity through the electronic platform (or, similarly, the electronic marketplace) may be initiated based on the item's popularity. In an example, the email service may update an entity profile of the entity with information about the popularity of the item as offered by the entity. The email service may send information about this update via an API to an inventory management system of the electronic marketplace. In turn, the inventory management system may generate an invitation to the entity for offering the item through the electronic platform.

At operation 716, a determination may be made that another item offered by entities is a popular item. This determination may be made based on email messages sent by the entities to the email addresses of the users, where the email messages may relate to orders for the item by the users from the entities. In an example, the email service may determine the item's popularity by identifying that the number of the users (or, similarly, the email messages) may exceed a threshold.

At operation 718, a process to offer the item from the electronic platform (or, similarly, the electronic marketplace) may be initiated based on the item's popularity. In an example, the email service may update a trend showing the item's popularity. The email service may send information about the trend via an API to the inventory management system of the electronic marketplace. In turn, the inventory management system may generate a catalog page for the item and a plan to inventory units of the item in a storage space of the electronic marketplace.

Figure 8:
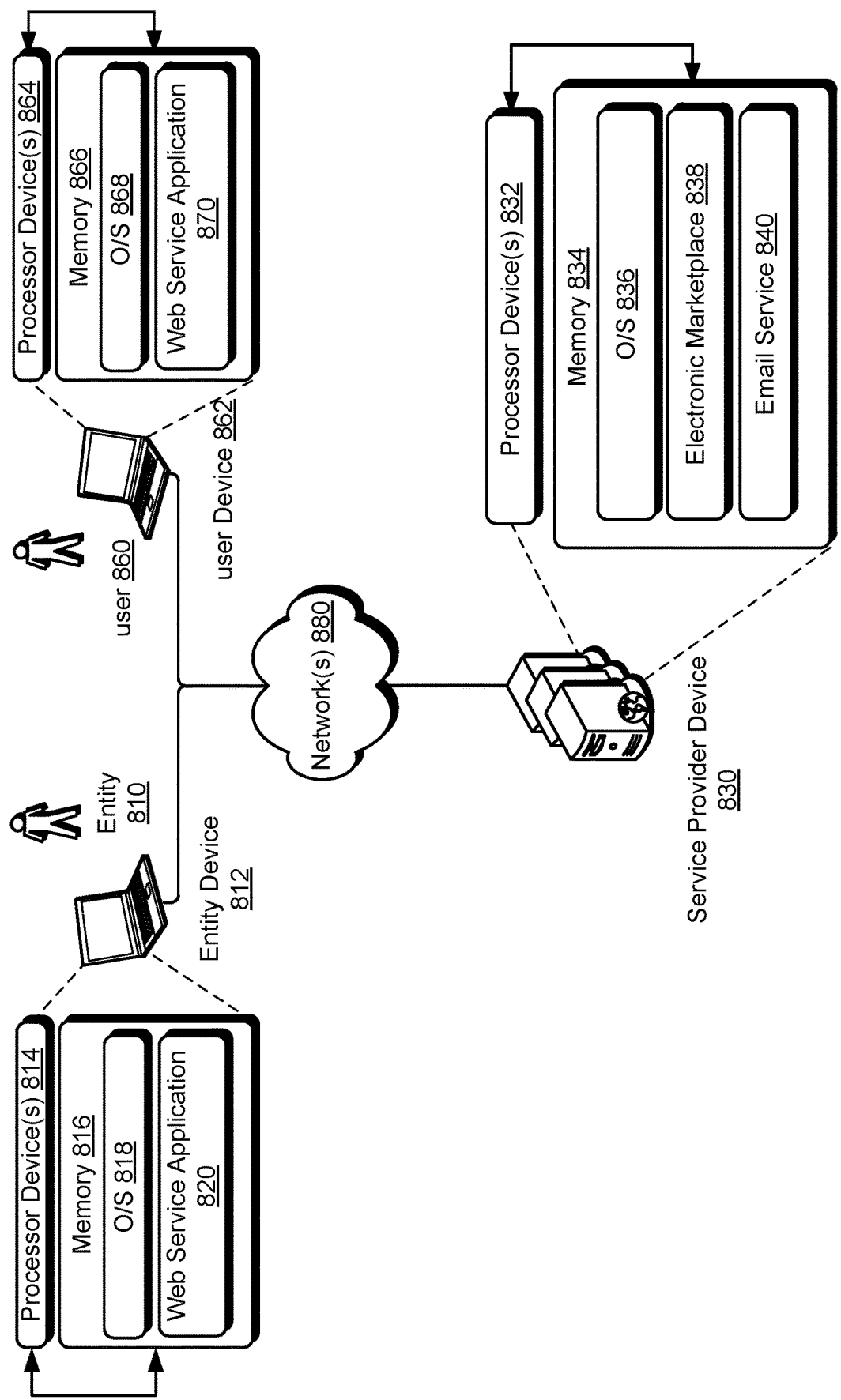
FIG. 8 illustrates an example architecture for providing a web-based resource, including at least one user device and/or one or more service provider devices connected via one or more networks, according to embodiments.

Turning to FIG. 8, that figure illustrates an example end-to-end computing environment for generating summaries from email messages in connection with a particular activity and for providing related functionalities. In this example, a service provider may implement an electronic platform within the context of, for example, an electronic marketplace available to users.

In a basic configuration, an entity 810 may utilize an entity device 812 to access local applications, a web service application 820, an entity account accessible through the web service application 820, a web site or any other network-based resources via one or more networks 880. In some aspects, the web service application 820, the web site, and/or the entity account may be hosted, managed, and/or otherwise provided by one or more computing resources of the service provider, such as by utilizing one or more service provider devices 830. The entity 810 may use the local applications and/or the web service application 820 to interact with the network-based resources of the service provider and perform entity-related transactions. These transactions may include, for example, offering items for sale and registering with an email service.

In some examples, the entity device 812 may be any type of computing devices such as, but not limited to, a mobile phone, a smart phone, a personal digital assistant (PDA), a laptop computer, a thin-client device, a tablet PC, etc. In one illustrative configuration, the entity device 812 may contain communications connection(s) that allow the entity device 812 to communicate with a stored database, another computing device or server, entity terminals, and/or other devices on the networks 880. The entity device 812 may also include input/output (I/O) device(s) and/or ports, such as for enabling a connection with a keyboard, a mouse, a pen, a voice input device, a touch input device, a display, speakers, a printer, etc.

The entity device 812 may also include at least one or more processing units (or processor device(s)) 814 and one memory 816. The processor device(s) 814 may be implemented as appropriate in hardware, computer-executable instructions, firmware, or combinations thereof. Computer-executable instructions or firmware implementations of the processor device(s) 814 may include computer-executable or machine-executable instructions written in any suitable programming language to perform the various functions described.

The memory 816 may store program instructions that are loadable and executable on the processor device(s) 814, as well as data generated during the execution of these programs. Depending on the configuration and type of entity device 812, the memory 816 may be volatile (such as random access memory (RAM)) and/or non-volatile (such as read-only memory (ROM), flash memory, etc.). The entity device 812 may also include additional storage, which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 816 may include multiple different types of memory, such as static random access memory (SRAM), dynamic random access memory (DRAM), or ROM.

Turning to the contents of the memory 816 in more detail, the memory may include an operating system (O/S) 818 and the one or more application programs or services for implementing the features disclosed herein including the web service application 820. In some examples, the entity device 812 may be in communication with the service provider devices 830 via the networks 880, or via other network connections. The networks 880 may include any one or a combination of many different types of networks, such as cable networks, the Internet, wireless networks, cellular networks, and other private and/or public networks. While the illustrated example represents the entity 810 accessing the web service application 820 over the networks 880, the described techniques may equally apply in instances where the entity 810 interacts with the service provider devices 830 via the entity device 812 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

Similarly, a user 860 may utilize user device 862 to access local applications, a web service application 870, a user account accessible through the web service application 870, a web site, or any other network-based resources via the networks 880. In some aspects, the web service application 870, the web site, and/or the user account may be hosted, managed, and/or otherwise provided by the service provider devices 830 and may be similar to the web service application 820, the web site accessed by the computing device 812, and/or the entity account, respectively.

The user 860 may use the local applications and/or the web service application 870 to conduct transactions with the network-based resources of the service provider. These transactions may include, for example, searching for items offered by the entity 810 at the network-based resources, receiving offers for the items, ordering items, registering with an email service, accessing an email box based on the email service, and other transactions.

In some examples, the user device 862 may be configured similarly to the entity device 812 and may include at least one or more processing units (or processor device(s)) 864 and one memory 866. The processor device(s) 864 may be implemented as appropriate in hardware, computer-executable instructions, firmware, or combinations thereof similarly to the processor device(s) 814. Likewise, the memory 866 may also be configured similarly to the memory 816 and may store program instructions that are loadable and executable on the processor device(s) 864, as well as data generated during the execution of these programs. For example, the memory 866 may include an operating system (O/S) 868 and the one or more application programs or services for implementing the features disclosed herein including the web service application 870.

As described briefly above, the web service applications 820 and 870 may allow the entity 810 and user 860, respectively, to interact with the service provider devices 830 to conduct transactions involving items. The service provider devices 830, perhaps arranged in a cluster of servers or as a server farm, may host the web service applications 820 and 870. These servers may be configured to host a web site (or combination of web sites) viewable via the computing devices 812 and 862. Other server architectures may also be used to host the web service applications 820 and 870. The web service applications 820 and 870 may be capable of handling requests from many entities 810 and users 860, respectively, and serving, in response, various interfaces that may be rendered at the computing devices 812 and 862 such as, but not limited to, a web site. The web service applications 820 and 870 may interact with any type of web site that supports interaction, including social networking sites, electronic retailers, informational sites, blog sites, search engine sites, news and entertainment sites, and so forth. As discussed above, the described techniques may similarly be implemented outside of the web service applications 820 and 870, such as with other applications running on the computing devices 812 and 862, respectively.

The service provider devices 830 may, in some examples, provide network-based resources such as, but not limited to, applications for purchase and/or download, web sites, web hosting, client entities, data storage, data access, management, virtualization, etc. The service provider devices 830 may also be operable to provide web hosting, computer application development, and/or implementation platforms, or combinations of the foregoing to the entity 810 and user 860.

The service provider devices 830 may be any type of computing device such as, but not limited to, a mobile phone, a smart phone, a personal digital assistant (PDA), a laptop computer, a desktop computer, a server computer, a thin-client device, a tablet PC, etc. The service provider devices 830 may also contain communications connection(s) that allow service provider devices 830 to communicate with a stored database, other computing devices or servers, entity terminals, and/or other devices on the network 880. The service provider devices 830 may also include input/output (I/O) device(s) and/or ports, such as for enabling connection with a keyboard, a mouse, a pen, a voice input device, a touch input device, a display, speakers, a printer, etc.

Additionally, in some embodiments, the service provider devices 830 may be executed by one or more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the service provider devices 830 may be in communication with the computing devices 812 and 862 via the networks 880, or via other network connections. The service provider devices 830 may include one or more servers, perhaps arranged in a cluster, or as individual servers not associated with one another.

In one illustrative configuration, the service provider devices 830 may include at least one or more processing units (or processor devices(s)) 832 and one memory 834. The processor device(s) 832 may be implemented as appropriate in hardware, computer-executable instructions, firmware, or combinations thereof. Computer-executable instruction or firmware implementations of the processor device(s) 832 may include computer-executable or machine-executable instructions written in any suitable programming language to perform the various functions described.

The memory 834 may store program instructions that are loadable and executable on the processor device(s) 832, as well as data generated during the execution of these programs. Depending on the configuration and type of the service provider devices 830, the memory 834 may be volatile (such as random access memory (RAM)) and/or non-volatile (such as read-only memory (ROM), flash memory, etc.). The service provider devices 830 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 834 may include multiple different types of memory, such as static random access memory (SRAM), dynamic random access memory (DRAM), or ROM.

Additionally, the computer storage media described herein may include computer-readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer-readable media does not include computer-readable communication media.

Turning to the contents of the memory 834 in more detail, the memory may include an operating system (O/S) 836, code for an electronic marketplace 838 and code for an email service 840. The code for the electronic marketplace may support different front end and back functionalities of the electronic marketplace. The code for the email service may support the different email service functionalities as described herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An electronic mail server comprising:
   a processor; and
   a memory storing computer-readable instructions that, upon execution by the processor, configure the electronic mail server to:
      provide an electronic mail box to a user, the electronic mail box hosted on the electronic mail server and identified based at least in part on an electronic mail address specific to the user;
      receive electronic mail messages sent by respective entities to the electronic mail address specific to the user, the electronic mail messages comprising a first electronic mail message and a second electronic mail messages, the first electronic mail message comprising a description of a status of an item ordered by the user from an entity of the respective entities, the description based at least in part on a first format specific to the entity;
      identify that the first electronic mail message is associated with an ordered item based at least in part on a parsing of the description and that the second electronic mail message from the electronic mail messages is unrelated to the ordered item;
      generate a summary from the description based at least in part on the first electronic mail message being associated with the ordered item, the summary describing the status of the item in a second format, the second format being specific to the electronic mail server such that the summary comprises fields common to summaries generated by the electronic mail server from descriptions received in other electronic mail messages of other entities;
      store the summary in the electronic mail box hosted on the electronic mail server;
      determine that the summary is to be presented in a first user interface view of a user interface to the electronic mail box;
      determine, based at least in part on the second electronic mail message being unrelated to the ordered item, that the second electronic mail message is to be presented in a second user interface view of the user interface, the second user interface view associated with a presentation of electronic messages unrelated to ordered items; and
      provide, to a computing device of the user based at least in part on an access of the computing device to the electronic mail box, the summary in the user interface to the electronic mail box, the user interface presenting the summary in the first user interface view, the user interface identifying the second electronic mail message in the second user interface view, wherein:
         the first user interface view presents the fields and an action that, upon selection, causes the electronic mail server to generate a response addressed to the entity, the second user interface view providing a functionality that includes:
: presenting a first user-selectable option to forward the second electronic mail message to another electronic mail box hosted on another electronic mail server,
presenting a second user-selectable option to delete the second electronic mail message from the electronic mail box hosted on the electronic mail server, and
restricting access to the second electronic mail message by restricting a presentation of content of the second electronic mail message in the second user interface view, the functionality excluding an option to present the content of the second electronic mail message.

2. The electronic mail server of claim 1, wherein the summary is provided in the user interface in lieu of the first electronic mail message, wherein the electronic mail server is associated with an electronic platform, wherein a domain part of the electronic mail address is associated with a domain name of the electronic platform, wherein the electronic platform is configured to offer items, and wherein the fields of the second format correspond to particular fields of the electronic platform that are configured to provide statuses of ordered items.

3. The electronic mail server of claim 1, wherein the summary is provided in an order folder of the user interface, and wherein the electronic mail server is further configured to:
identify that the second electronic mail message sent to the electronic mail address of the user is not associated with any ordered item by the user;
generate a second summary that identifies a sender of the second electronic mail message and a subject of the second electronic mail message; and
provide the second summary in a non-order folder of the user interface.

4. A computer-implemented method, comprising:
receiving an electronic mail message sent by an entity to an electronic mail address of a user, the electronic mail message describing a status of an item ordered by the user from the entity based at least in part on a first format specific to the entity, the electronic mail address identifying an electronic mail box that is accessible to the user via a user interface;
generating a summary based at least in part on the electronic mail message, the summary describing the status of the item in a second format, the second format being common to generated summaries such that the summary comprises fields common to another summary generated for another electronic mail message of another entity;
determining that the summary is to be presented in a first user interface view of the user interface;
determining that a second electronic mail message is to be presented in a second user interface view of the user interface, the second user interface view associated with a presentation of electronic messages unrelated to ordered items; and
providing the summary for presentation in the user interface of the electronic mail box, wherein the user interface presents the summary in the first user interface view and identifies the second electronic mail message in the second user interface view, wherein presentation of content of the second electronic mail message is restricted in the second user interface view, wherein:
the first user interface view presents an action that, upon selection, generates a response addressed to the entity, and
the second user interface view presents a first user-selectable option to forward the second electronic mail message to another electronic mail box and a second user-selectable option to delete the second electronic mail message from the electronic mail box.

5. The computer-implemented method of claim 4, wherein the electronic mail box is hosted on an electronic platform that is configured to offer items, and wherein the fields of the second format correspond to status fields used at the electronic platform and configured to provide statuses of ordered items, and wherein the user interface comprises at least one of: a web page interface to the electronic mail box or an application interface to the electronic mail box.

6. The computer-implemented method of claim 4, wherein the fields represent at least one of: an identifier of the entity, an identifier of the item, an order date, an order number, an order status, a payment confirmation, a delivery date estimate, or a return option.

7. The computer-implemented method of claim 6, wherein the user interface enables a sorting of summaries based at least in part on the identifier of the entity, the identifier of the item, the order date, the order status, or the delivery date estimate.

8. The computer-implemented method of claim 4, wherein the electronic mail address is generated based at least in part on a registration process, and wherein the second format is defined based at least in part on input of the user via the registration process or subsequent to the registration process.

9. The computer-implemented method of claim 4, further comprising:
identifying the item based at least in part on the electronic mail message;
identifying a supplemental item that supplements a feature of the item;
generating an offer for the supplement item;
identifying an interest of the user based at least in part on a plurality of electronic mail messages received at the electronic mail address;
including the interest in a profile of the user; and
generating one or more offers for items based at least in part on the interest being included in the profile.

10. The computer-implemented method of claim 4, wherein the electronic mail box is hosted on an electronic platform that is configured to offer items, and further comprising:
identifying that the item has been ordered by users from the entity at a frequency that exceeds a threshold, the frequency determined based at least in part on electronic mail messages sent by the entity to electronic mail addresses corresponding to the users, wherein the electronic mail addresses have a common domain part associated with the electronic platform;
including in a profile of the entity an indication that the frequency exceeds the threshold and an identifier of the item; and
initiating a process for offering the item from the entity through the electronic platform.

11. The computer-implemented method of claim 4, wherein the electronic mail box is hosted on an electronic platform that is configured to offer items, and further comprising:
  identifying that the item has been ordered by users from one or more entities at a frequency that exceeds a threshold, the frequency determined based at least in part on electronic mail messages sent by the one or more entities to electronic mail addresses corresponding to the users, wherein the electronic mail addresses have a common domain part associated with the electronic platform; and
  initiating a process for offering the item from an electronic marketplace.

12. The computer-implemented method of claim 11, wherein the item is offered from the electronic marketplace based at least in part on an inventory space that stores units of the item, and further comprising: providing an identifier of the item and information about the frequency to an inventory management system of the inventory space, wherein the inventory management system is configured to generate a plan for inventorying the units of the item based at least in part on the identifier of the item and information about the frequency.

13. One or more non-transitory computer-readable storage media comprising instructions that, upon execution on a computer system, cause the computer system to perform operations comprising:
  receiving an electronic mail message sent by an entity to an electronic mail address of a user, the electronic mail message describing a status of an item ordered by the user from the entity based at least in part on a first format specific to the entity, the electronic mail address identifying an electronic mail box that is accessible to the user via a user interface, the electronic mail box provided from an electronic platform that is configured to offer items to the user;
  generating a summary based at least in part on the electronic mail message, the summary describing the status of the item in a second format, the second format being specific to the electronic platform such that the summary comprises fields common to a description provided by the electronic platform for a second status of a second item ordered by the user from the electronic platform;
  determining that the summary is to be presented in a first view of the user interface;
  determining that a second electronic mail message is to be presented in a second view of the user interface, the second view associated with a presentation of electronic messages unrelated to ordered items; and
  providing the summary for presentation in the user interface of the electronic mail box, wherein the user interface presents the summary in the first view and identifies the second electronic mail message in the second view, wherein presentation of content of the second electronic mail message is restricted in the second view, wherein:
    the first view presents an action that, upon selection, causes the computer system to generate a response addressed to the entity, and
    the second view presents a first selectable option to forward the second electronic mail message to another electronic mail box and a second selectable option to delete the second electronic mail message from the electronic mail box.

14. The one or more non-transitory computer-readable storage media of claim 13, wherein the user interface is at least one of a read only web page interface or a read only application interface, wherein the summary comprises a link to the electronic mail message, and further storing additional instructions that, upon execution on the computer system, cause the computer system to perform additional operations comprising: providing the electronic mail message for presentation in a second user interface based at least in part on an activation of the link.

15. The one or more non-transitory computer-readable storage media of claim 13, wherein the electronic mail message is not forwarded to an alternate electronic mail address of the user based at least in part on a determination that the electronic mail message is associated with an ordered item, and further storing additional instructions that, upon execution on the computer system, cause the computer system to perform additional operations comprising:
  identifying that the second electronic mail message sent to the electronic mail address of the user is not associated with any ordered item by the user; and
  forwarding the second electronic mail message to the alternate electronic mail address of the user based at least in part on the second electronic mail message not being associated with any ordered item.

16. The one or more non-transitory computer-readable storage media of claim 13, further storing additional instructions that, upon execution on the computer system, cause the computer system to perform additional operations comprising:
  determining an identifier of the entity based at least in part on the electronic mail message;
  identifying the first format based at least in part on the identifier;
  identifying attributes expected in the electronic mail message based at least in part on the first format being identified;
  parsing the electronic mail message based at least in part on the attributes to identify values corresponding to the attributes; and
  populating the fields for the summary based at least in part on the values.

17. The one or more non-transitory computer-readable storage media of claim 13, further storing additional instructions that, upon execution on the computer system, cause the computer system to perform additional operations comprising:
  determining that the electronic mail message does not contain an image of the item;
  identifying a computing resource that stores the image;
  accessing the image from the computing resource; and
  inserting the image in a field of the summary.

18. The one or more non-transitory computer-readable storage media of claim 13, further storing additional instructions that, upon execution on the computer system, cause the computer system to perform additional operations comprising:
  receiving a third electronic mail message sent by the entity to the electronic mail address of the user, the third electronic mail message related to the item ordered by the user from the entity; and
  merging information from the electronic mail message and the third electronic mail message in the summary.

19. The one or more non-transitory computer-readable storage media of claim 13, further storing additional instructions that, upon execution on the computer system, cause the computer system to perform additional operations comprising:

receiving a third electronic mail message sent by a second entity to the electronic mail address of the user, the third electronic mail message related to the item ordered by the user from the entity; and merging information from the electronic mail message and the third electronic mail message in the summary.

20. The electronic mail server of claim 1, wherein the response is generated based at least in part on a template specific to the entity, and wherein the response comprises information from one or more fields of the summary.

* * * * *